United States Patent [19]

Furnas

[11] 4,204,825
[45] May 27, 1980

[54] FOAM MOLD CLAMP ASSEMBLY

[75] Inventor: Robert L. Furnas, Wautoma, Wis.

[73] Assignee: Milsco Manufacturing Company, Brown Deer, Wis.

[21] Appl. No.: 40,175

[22] Filed: May 18, 1979

[51] Int. Cl.² .............................................. B29C 1/00
[52] U.S. Cl. ................................ 425/451.9; 425/595; 425/4 R
[58] Field of Search ..................... 425/451.9, 595, 406, 425/4 R

[56] References Cited

U.S. PATENT DOCUMENTS

| | | | |
|---|---|---|---|
| 3,070,860 | 1/1963 | Fanwick | 425/595 X |
| 3,323,173 | 6/1967 | Poyner | 425/451.9 X |
| 3,816,052 | 6/1974 | Schoppee | 425/406 |
| 4,032,276 | 6/1977 | Mercer | 425/451.9 X |
| 4,080,145 | 3/1978 | Jung | 425/4 R X |

Primary Examiner—J. Howard Flint, Jr.
Attorney, Agent, or Firm—James E. Nilles

[57] ABSTRACT

Clamping mechanism for a mold having hingedly connected upper and lower mold members comprises an elongated handle pivoted at one end to the upper mold member to have its opposite end swing from a clamping position in which the handle overlies the upper mold member, to and beyond an upwardly projecting intermediate position. Overlying the pivoted end portion of the handle when the mold is closed is a reaction member having a downwardly facing camming reaction surface and an upwardly facing fulcrum reaction surface. An eccentric cam element on the pivoted end portion of the handle engages the camming reaction surface to clamp the mold shut as the handle is swung towards its clamping position. As the handle is swung to and beyond its intermediate position, an abutment on it, spaced along it from the axis about which it swings, engages the fulcrum reaction surface so that the handle functions as a lever whereby force exerted to swing it farther beyond said intermediate position is applied to lifting the upper mold member against adhesion to a molded part.

7 Claims, 7 Drawing Figures

U.S. Patent May 27, 1980 Sheet 1 of 3 4,204,825
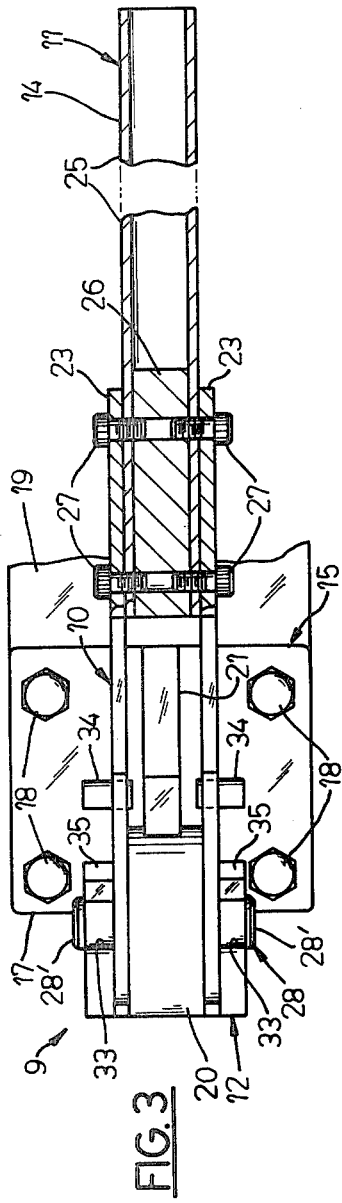
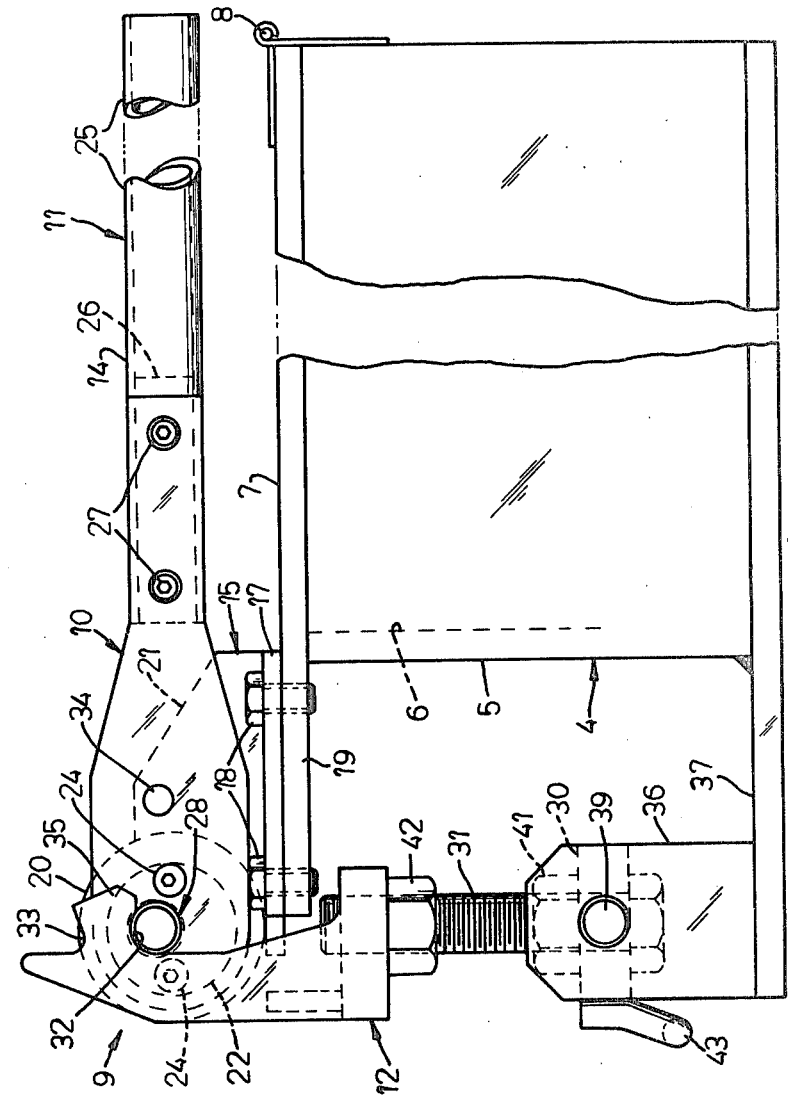
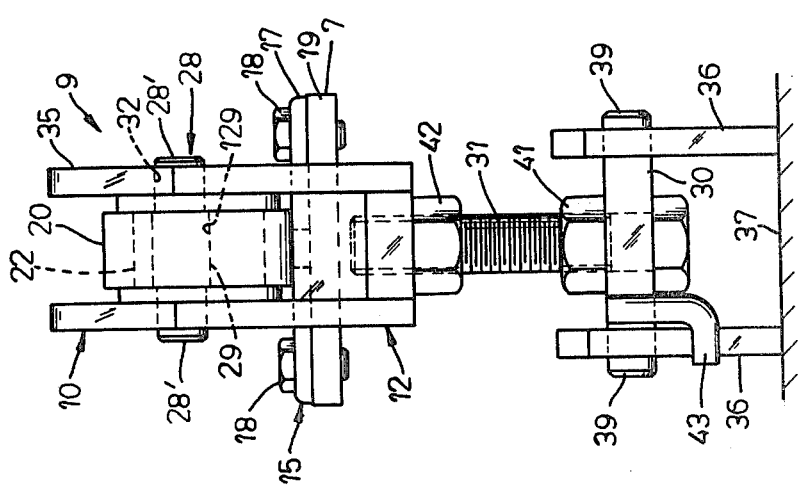

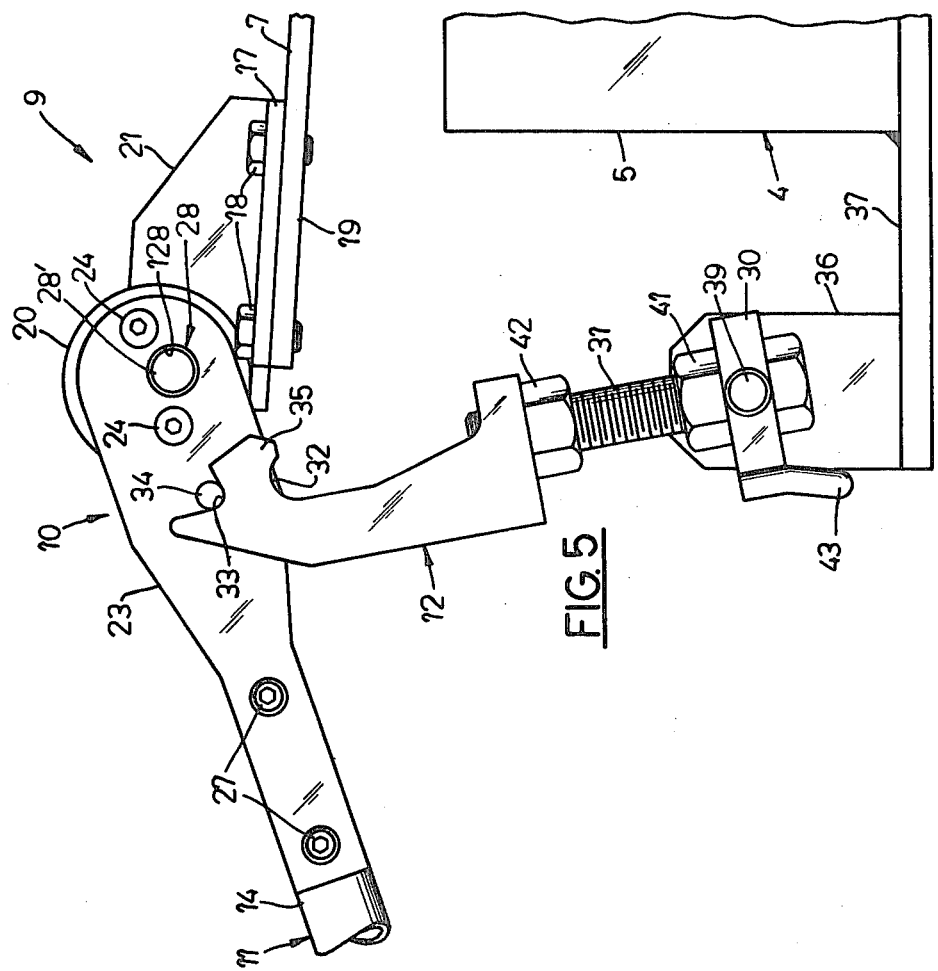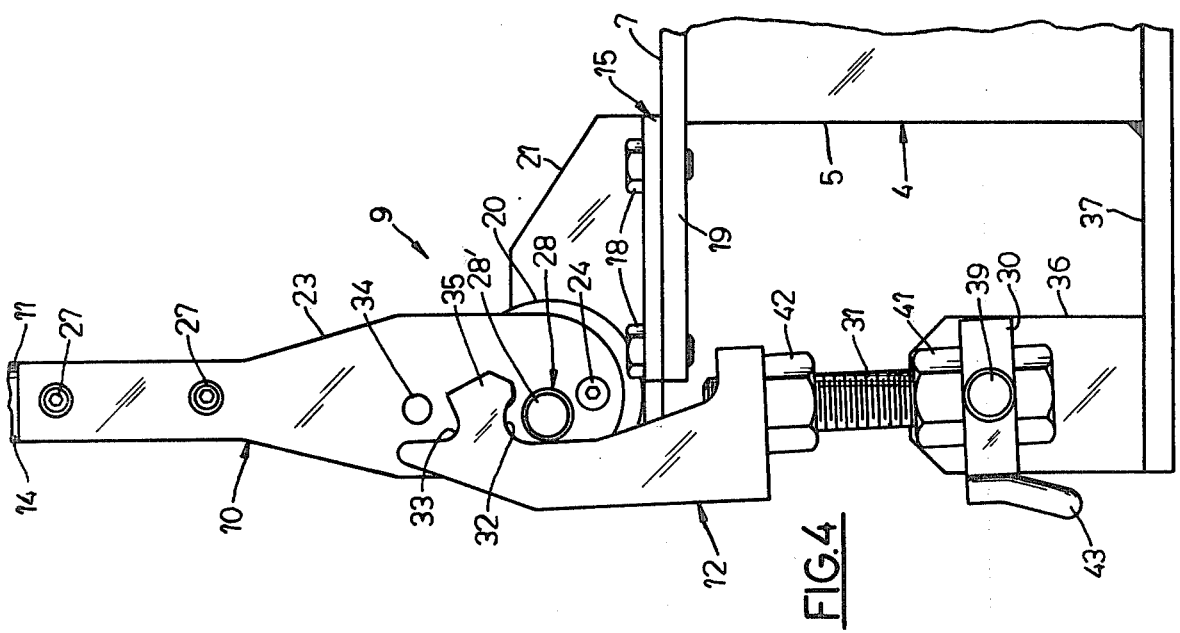

FOAM MOLD CLAMP ASSEMBLY

FIELD OF THE INVENTION

This invention relates to a mold clamp by which hingedly connected upper and lower mold members are clamped shut during a molding operation and which is releasable to permit the mold members to be swung apart for removal of a molded part from the lower mold member; and the invention is more particularly concerned with a mold clamp which can be manually actuated away from a mold clamping position to cause the upper mold member to be forcefully separated from the lower one, thus overcoming any tendency for the upper mold member to adhere to a molded part confined in the lower mold member.

BACKGROUND OF THE PRIOR ART

In the molding of certain plastic articles, hingedly connected upper and lower mold members are clamped in a closed position during a molding operation and are released and swung apart at the conclusion of the operation to allow the molded part to be removed from the lower mold member. Various devices are known that enable releasable clamping force to be manually applied to mold members, but the clamping devices heretofore available for the purpose have not been accommodated to a problem that arises with plastics that have a tendency to adhere to mold surfaces. Foam plastics particularly exhibit this tendency, even when releasing agents are used with them. When such materials are molded adhesion between the molded article and the upper mold member resists separation of the mold members.

Prior manually operated mold clamping mechanisms made no provision for forceful separation of the mold members against such adhesion. Hence, mold operators had to exert great force on the clamping mechanism handle in order to break the adhesion between the upper mold member and the molded article, or resorted to various time consuming improvisations for forcing the upper mold member away from the lower one.

Power driven actuators can of course apply clamping and releasing forces of substantial magnitude, but powered actuators are relatively expensive, especially if they are complicated, as in the case of the molding apparatus disclosed in U.S. Pat. No. 3,816,052. A less complicated powered mechanism for bringing upper and lower mold members into clamped engagement and for separating them at the conclusion of a molding operation is disclosed in the U.S. Pat. No. 4,080,145 to Jung. However, even the mechanism of the last mentioned patent incorporates two pressure fluid energized cylinder jacks, one of them for moving the upper mold member vertically to and from engagement with the lower member and the other one for swinging the upper member to a position in which the lower mold member is accessible for removal of a molded part therefrom.

For many molding operations the cost of even a simple power mechanism is not economically justified; but, on the other hand, production tends to be delayed by the need for exerting high manual forces for mold opening, and there is a further element of cost in the unpleasant working conditions created by that necessity. It has long been obvious that there was inconvenience and inefficiency in manually operated mold clamps that could not effect forceful separation of the mold members along with the release of clamping force, but heretofore no mechanism was available which could be operated to accomplish that objective, notwithstanding the very evident need for it.

To be satisfactory, such a manually operated device should have a single actuator and should be so arranged that a single convenient and natural movement of that actuator first releases clamping force on the mold members and then forces the upper mold member upwardly away from the lower one without the need for exerting any great manual effort. Once the mold members are initially separated, it should be possible to use the same actuator as a handle whereby the upper mold member can be swung about its hinged connection with the lower one to fully open the mold so that the molded article can be removed from the lower mold member. Inasmuch as the cooperating parts of the clamping device that are mounted on the upper and lower mold members, respectively, are separated by a substantial distance when the upper mold member is swung to its fully open position, those parts should be brought directly back into cooperating relationship with one another as the upper mold member is swung back towards its mold closed position, so that the mold can be clamped shut quickly and conveniently.

The present invention meets all of these requirements.

SUMMARY OF THE INVENTION

The general object of the present invention is to provide a simple, inexpensive and reliable manually actuatable mold clamp by which hingedly connected upper and lower mold members can be releasably clamped shut and by which the upper mold member can be manually raised with relatively little effort against force that tends to maintain it engaged with the lower one.

Another object of the invention is to provide a manually actuatable mold clamp having a handle which is swung in one direction to clamp the mold shut and is swung in the opposite direction to successively unclamp the mold members and force the upper mold member out of engagement with the lower one, the same handle thereafter being available to swing the upper mold member about its hinged connection with the lower one.

Thus it is a more specific object of the invention to provide a mold clamping and mold opening device that comprises a single manually actuated handle with which an operator can effect unlocking of the mold and forceful raising of the upper mold member off of the lower one, all in one easy motion, and with which, without releasing his grip, the operator can thereafter swing the upper mold member about its hinged connection with the lower one, said device also providing for quick and convenient clamping of the mold merely by a reversal of the motions just described.

A further specific object of the invention is to provide a manually operated device that employs camming action to confine upper and lower mold members in clamped engagement with one another and employs leverage for separation of the mold members against adhesive force that tends to maintain the upper mold member engaged with the lower one.

In general, these and other objects of the invention are achieved in mechanism that comprises an elongated handle having at one end portion thereof a pivotal connection with an upper mold member that is swingable relative to a lower mold member about a hinge at one side of the mold. The pivotal connection between the handle and the upper mold member is at a location that is spaced from the hinge, and enables the opposite end portion of the handle to swing about the axis of said connection so that it can move from a clamping position in which the handle overlies the upper mold member to and beyond an intermediate position in which the handle projects away from the upper mold member. A reaction member that is secured to the lower mold member has a portion which is upwardly adjacent to said one end portion of the handle when the upper mold member is in its closed position, and said portion of the reaction member has a downwardly facing camming reaction surface and an upwardly facing fulcrum reaction surface. Said one end portion of the handle has a cam element thereon that is eccentric to said axis and is cooperable with the camming reaction surface to clamp the upper mold member in its closed position upon swinging of the handle to its clamping position. The handle also has abutment means thereon, between said axis and the opposite end portion of the handle, located to engage the fulcrum reaction surface upon swinging of the handle from its clamping position to its intermediate position so that the handle is fulcrummed as a lever whereby force that swings it further away from its clamping position is applied to moving the upper mold member out of its closed position.

Preferably the reaction member is bifurcated so that the handle can be received between its bifurcations when the handle is moved to and beyond its intermediate position.

Preferably said axis about which the handle swings is parallel to that of the hinge, and the reaction member is pivotally secured to the lower mold member at a side thereof that is remote from the hinge for limited swinging motion about an axis which is also parallel to that of the hinge and which is spaced below the top of the lower mold member. It is also preferred that the camming reaction surface be downwardly concavely curved and that the fulcrum reaction surface be upwardly concavely curved.

BRIEF DESCRIPTION OF THE DRAWINGS

In the accompany drawings, which illustrate what is now regarded as a preferred embodiment of the invention:

FIG. 1 is a view in side elevation of a mold clamp mechanism embodying the principles of this invention, installed on a mold comprising upper and lower mold members and shown in its mold clamping condition;

FIG. 2 is a view in end elevation taken from the left side of FIG. 1;

FIG. 3 is a plan view corresponding to FIGS. 1 and 2;

FIG. 4 is a view generally similar to FIG. 1 but showing the mechanism in an intermediate condition in which clamping force on the upper and lower mold members is released;

FIG. 5 is a view generally similar to FIG. 1 but showing the mechanism in a mold opening condition in which the mold members are separated from one another;

DESCRIPTION OF PREFERRED EMBODIMENT OF THE INVENTION

Figure 6:
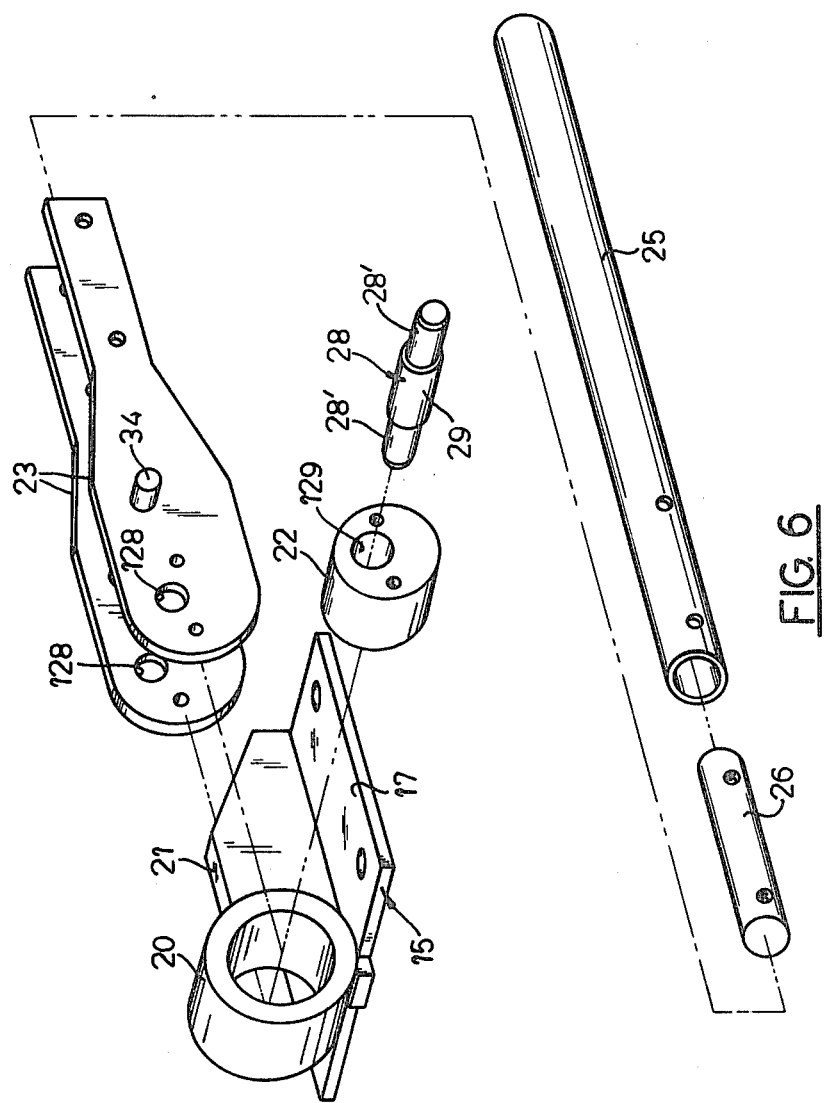
FIG. 6 is a disassembled perspective view of the components of the mechanism that are connected with the upper mold members.
Figure 7:
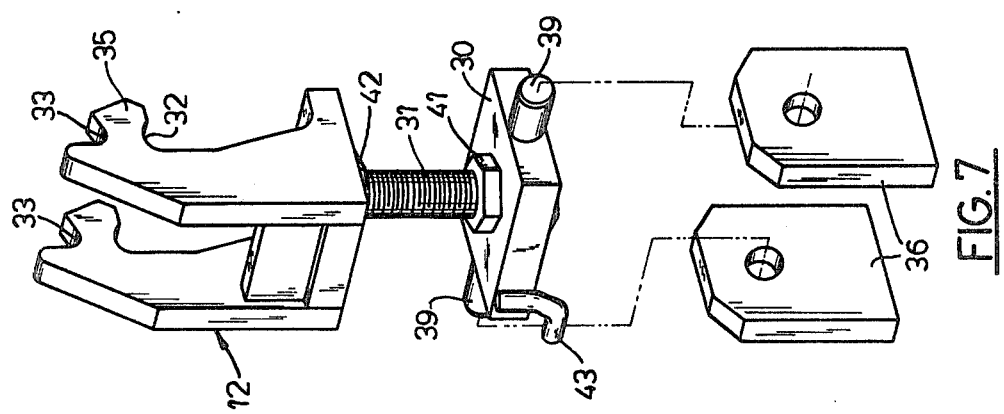
FIG. 7 is a disassembled perspective view of the components of the mechanism that are mounted on the lower mold member.

Referring now to the accompanying drawings, the numeral 4 designates generally a mold that comprises a lower mold member 5 wherein there is a conventional upwardly opening mold cavity 6, and an upper mold member 7 that closes the cavity. At one side of the mold 4 is a hinge 8 that connects the upper and lower mold members. At the opposite side of the mold is a manually actuatable mechanism of this invention, which is designated generally by 9 and by which the upper mold member 7 is held clamped against the lower mold member 5 during a molding operation. As explained hereinafter, the mechanism 9 also serves for opening the mold at the conclusion of a molding operation to permit the molded article to be removed from the cavity 6.

The mechanism 9 comprises two main parts, namely a lever assembly 10 that is mounted on the upper mold member 7 and a retainer assembly that is mounted on the lower mold member 5 and comprises a more or less hook-like reaction member 12.

The lever assembly 10 comprises an elongated handle 14 having a pivoted end portion at which it is swingably connected with the upper mold member 7 and an opposite end portion that comprises an actuator 11. The connection between the handle 14 and the upper mold member 7 is provided by a bracket 15 which, as best seen in FIG. 6, comprises a base plate 17 on which there is fixed a short tubular bearing member 20. The base plate 17 can be flatwise secured, as by means of bolts 18, to the top surface of the upper mold member 7, near the edge 19 thereof that is remote from the hinged connection 8, and preferably, as shown, the bracket 15 overlies a portion of the upper mold member 7 that projects horizontally beyond the lower mold member 5. The bearing member 20, which is secured to the top of the base plate 17 as by welding, has its axis horizontal and parallel to the axis of the hinge connection 8. Preferably a strut 21 is welded to the base plate 17 and to the bearing member 20 to ensure a firm and secure connection between them.

The pivotal connection between the bracket 15 and the handle 14 comprises a cylindrical trunnion 22 that is received in the bore of the tubular bearing member 20 with a close rotatable fit. The handle 14 comprises a pair of flat, paddle-shaped parts 23 that have their wide end portions flatwise overlying the opposite ends of the trunnion 22. The paddle-shaped parts 23 are secured to the trunnion by means of bolts 24 that are threaded into the trunnion in spaced, parallel relation to its axis to constrain the trunnion to rotate in unison with swinging of the handle 14.

At their narrow ends the paddle-shaped parts 23 are connected to a length of pipe 25 that comprises the actuator 11. The narrow portions of the respective paddle-shaped parts extend lengthwise along opposite sides of the pipe 25, and a short length of rod 26 that is received inside the connecting portion of the pipe has diametrically opposite threaded holes in which are received bolts 27 that extend laterally through the paddle-shaped parts and the pipe to connect them. In addition to securing the bolts 27, the rod 26 affords stiffening reinforcement to the pipe 25 to enable it to sustain the bending stresses imposed upon it.

It will be seen that the pivotal connection between the handle 14 and the bracket 15 is such that, in relation to the upper mold member 7, the handle 14 can be swung up and around through somewhat more than 180° in each direction about the axis of the bearing member 20, between a clamping position (FIG. 1) in which the handle overlies the upper mold member 7 and projects horizontally to have its actuator 11 near the hinge 8 and a mold-opening position (FIG. 5) in which the handle projects substantially horizontally in the opposite direction. In so moving, the handle 14 passes through an intermediate position (FIG. 4) in which it projects upwardly away from the upper mold member.

Swinging of the handle 14 to its clamping position rotates a cam 28 on its pivoted end portion into sliding engagement with the hook-like reaction member 12 to cause a downward clamping force to be applied to the upper mold member 7 by which it is firmly engaged against the top of the lower mold member 5. As shown, the cam 28 comprises a pin 29 that extends through an eccentric axial bore 129 in the trunnion 22 and has reduced diameter end portions 28' which project out through a hole 128 in each of the paddle-shaped pieces. The end portions 28' of the pin 29 provide the eccentric cam surfaces proper that cooperate with the reaction member 12.

The reaction member 12 is upwardly elongated and bifurcated so that its bifurcations can straddle the pivoted end portion of the handle 14. By means of a knuckle 30 that is pivoted to the lower mold member and a stud 31 that extends between the reaction member 12 and said knuckle, the reaction member is mounted to swing about an axis that is parallel to the axis of the hinge 8 and spaced below the top of the lower mold member 5. Near its upper end the reaction member has a portion 35 that projects substantially horizontally towards the hinge 8 at a level a substantial distance above the top of the lower mold member. A downwardly concave lower surface 32 on this laterally projecting portion 35 comprises a downwardly facing camming reaction surface against which the cam 28 engages as the handle 14 is swung to its clamping position. The projection 35 also has an upwardly concave surface 33 which is spaced above the camming reaction surface 32 and which comprises an upwardly facing fulcrum reaction surface that cooperates with an abutment or fulcrum element 34 on the handle 14 as the handle is swung to its mold-opening position.

The abutment 34 is fixed on the handle between its pivot axis and its actuator 11, and it projects laterally from the handle, parallel to its pivot axis. As shown, the abutment 34 comprises a short outwardly projecting pin fixed in each of the paddle-shaped parts 23. The distance between the abutment 34 and the axis of the trunnion 22 is such that as the handle 14 is swung away from its clamping position, the abutment is carried upwardly around the outer end of the projection 35 on the reaction member and into the upwardly opening bay or groove in the reaction member that defines the fulcrum reaction surface 33, coming to rest on that surface 33 just after the handle 14 has passed its straight-up position shown in FIG. 4. During further movement of the handle away from its clamping position, the abutment 34—now seated on the fulcrum reaction surface 33—serves as a fulcrum about which the handle 14 swings, so that the handle functions as a lever whereby force exerted upon its actuator portion 11 to swing it away from the clamping position is applied to raising the upper mold member 7 away from the lower mold member 5 and out of adhesive engagement with a molded article in the mold. Such lifting force is of course imposed upon the upper mold member at its connection with the handle 14, hence the axis of the tubular bearing member 22 can be taken as the point of force application to the upper mold member. It will be observed that the distance between said point of force application and the fulcrum abutment 34 is substantially smaller than the distance between the fulcrum 34 and the actuator 11, so that the handle forms a lever that has a high mechanical advantage. It will also be noted that the actuator portion 11 of the handle is moving in a more or less downward direction when such lifting force is being applied to the upper mold member so that little effort is needed to overcome strong adhesion.

Once the upper mold member 7 has been freed from adhesion to a molded article in the lower mold member 5, the handle 14 can be used to swing the upper mold about the hinge connection 8, inasmuch as the abutment 34 can be moved straight up off of the fulcrum reaction surface 33. Because the reaction member 12 is mounted to swing about its connection with the lower mold member 5, the position of the upwardly concave fulcrum reaction surface 33 automatically adjusts itself to the position of the abutment 34 during opening of the mold.

The connection between the lower mold member 5 and the reaction member 12 comprises a pair of spaced apart standards 36 that project up from a flat horizontal base 37 on the bottom of the lower mold member. The knuckle 30 is pivoted between the standards 36 by means of laterally oppositely projecting coaxial pins 39 on the knuckle, received in closely fitting holes in the standards, near their tops. The stud 31 that connects the knuckle 30 with the reaction member 12 proper is threaded along its length and has its headed lower end portion projecting up through the knuckle 30, to which the stud is secured by a nut 41. The upper end portion of the stud is threaded into the transversely extending base portion of the U-shaped reaction member 12 proper, and that member is confined against rotation relative to the stud by means of a jam nut 42. Because of the threaded connection between the knuckle 30 and the reaction member 12, the latter is readily heightwise adjustable so that its camming reaction surface 32 can be established at the level at which it cooperates with the cam 28 for clamping the upper mold member firmly to the lower one.

A downwardly projecting tang 43 on the knuckle 30 is engageable with one of the standards 36 to define a limit of swinging motion of the reaction member 12 in the direction away from the lower mold member. This prevents the reaction member 12 from falling away from the lower mold member while the mold is open. Hence, during closing of the mold, only a slight push on the reaction member is necessary to bring it to a position in which the cam 28 can readily enter the downwardly opening bay that comprises the camming reaction surface 32. The handle 14 can then be swung directly down to its clamping position shown in FIG. 1 to clamp the mold shut.

From the foregoing description taken with the accompanying drawings it will be seen that this invention provides a clamp for a mold comprising hingedly connected upper and lower mold members whereby the upper mold member can be forcefully disengaged from the lower one with the exertion of only a small manual force, and wherein such release of the upper mold member is accomplished by a convenient manipulation of the same handle that is used to clamp the mold shut and to swing the upper mold member about its hinged connection with the lower one.

I claim:

1. In a mold having an upper mold member that is swingable relative to a lower mold member about a hinge at one side of the mold, manually actuatable mechanism by which the upper mold member can be releasably clamped in a closed position overlying the lower mold member and can be moved out of said closed position against a force that tends to maintain it therein, said mechanism comprising:
   A. an elongated handle having at one end portion thereof a pivotal connection with said upper mold member at a location on the upper mold member that is spaced from said hinge, said pivotal connection enabling the opposite end portion of said handle to swing about the axis of said connection so that it can move from a clamping position in which the handle overlies the upper mold member to and beyond an intermediate position in which the handle projects away from the upper mold member;
   B. a reaction member secured to the lower mold member and having a portion which is upwardly adjacent to said one end portion of the handle when the upper mold member is in its closed position, said portion of the reaction member having
      (1) a downwardly facing camming reaction surface and
      (2) an upwardly facing fulcrum reaction surface;
   C. a cam element on said one end portion of the handle, said cam element being eccentric to said axis and being cooperable with said camming reaction surface to clamp the upper mold member in its closed position upon swinging of the handle to its clamping position; and
   D. abutment means on the handle, between said axis and said opposite end portion of the handle, said abutment means being located to engage said fulcrum reaction surface upon swinging of the handle from its clamping position to its intermediate position, so that the handle is fulcrummed as a lever whereby force that swings it further away from its clamping position is applied to moving the upper mold member out of its closed position.

2. The mechanism of claim 1, wherein said reaction member is bifurcated so that the handle can be received between its bifurcations when the handle is moved to and beyond its intermediate position.

3. The mechanism of claim 1, wherein said axis of the pivotal connection is parallel to the axis of said hinge, and said reaction member is pivotally secured to the lower mold member at a side thereof that is remote from the hinge, for limited swinging motion about an axis which is parallel to that of said pivotal connection and which is spaced below the top of the lower mold member.

4. The mechanism of claim 1, wherein said camming reaction surface is downwardly concavely curved and said fulcrum reaction surface is upwardly concavely curved.

5. Manually actuatable mechanism by which an upper mold member that is hinged to a lower mold member can be releasably clamped in a closed position overlying the lower mold member, said mechanism being of the type that comprises a cam member mounted on the upper mold member for rotation relative thereto about a substantially horizontal axis, an elongated handle having one end portion connected with said cam member and having its opposite end portion swingable about said axis to impart rotation to said cam member, and a reaction member which is attached to said lower mold member, said reaction member having a camming reaction surface which faces downwardly towards said axis when the upper mold member is in its closed position and with which said cam member cooperates, when the handle is swung to a clamping position in which it overlies the upper mold member, to apply clamping force to the upper mold member, said mechanism being characterized by:
   A. said reaction member having thereon a fulcrum reaction surface which is substantially opposite said camming reaction surface and which faces upwardly; and
   B. said handle having thereon an abutment which is engageable against said fulcrum reaction surface upon swinging of the handle away from its clamping position, said abutment thus fulcrumming the handle so that force which is exerted to swing the handle farther from its clamping position is applied to lifting the upper mold member away from engagement with the lower one.

6. Manually actuatable mechanism by which an upper mold member that is hinged to a lower mold member can be releasably clamped in a closed position overlying the lower mold member and can be lifted out of said closed position against a force that tends to maintain it in said closed position, said mechanism being characterized by:
   A. an elongated handle;
   B. attachment means for connecting one end portion of said handle with an upper mold member, said attachment means pivoting the handle to swing about an axis through its said end portion;
   C. cam means on said one end portion of the handle, in such concentric relation to said axis as to be moved away from the upper mold member in consequence of swinging of the handle to a clamping position in which the handle overlies the upper mold member;
   D. a reaction member having a portion on which there is a camming reaction surface that faces in one direction and a fulcrum reaction surface that faces in substantially the opposite direction;
   E. securement means for fastening said reaction member to a lower mold member with said portion of the reaction member so located that with the upper mold member in its closed position said camming reaction surface overlies said cam means and is engaged by the same as the handle is swung to its clamping position; and
   F. abutment means on the handle, between said axis and the opposite end of the handle, said abutment means being located to engage said fulcrum reaction surface as the handle is swung away from its clamping position, to thus fulcrum the handle as a lever whereby force that swings the handle farther away from its clamping position is applied to said attachment means for lifting the upper mold member out of its closed position.

7. Manually actuatable mechanism whereby an upper mold member can be clamped in engagement with a lower mold member and can be raised out of such engagement against a force that tends to maintain the mold members engaged, said mechanism comprising:

A. an elongated reaction member having a pair of opposite ends;
B. securement means for attaching the reaction member to the lower mold member with one end of the reaction member uppermost and swingable in a pair of opposite substantially horizontally directions;
C. an elongated lever having a pivoted end portion and an actuator end portion;
D. pivotal attachment means for connecting said lever to the upper mold member to swing relative thereto about a substantially horizontal axis which extends through said pivoted end portion and which is so arranged in relation to the upper mold member that the lever can swing between a clamping position in which it projects substantially in one of said horizontal directions and a mold-open position in which it projects substantially in the opposite direction, through an intermediate position projecting away from the upper mold member;
E. cooperating overcenter means on said lever and said reaction member providing a clamping connection between said attachment means and said securement means whereby movement of said lever to its clamping position imposes convergent forces on said securement means and said attachment means, said overcenter means comprising
  (1) a part on said lever which is spaced from said axis and is rotated to a position above the same by swinging of the lever to its clamping position and
  (2) a cooperating part on the upper end portion of the reaction member; and
F. cooperating fulcrum means on the lever, spaced along it from said axis, and on the reaction member, on said upper end portion thereof, engageable upon swinging of the lever through its intermediate position to fulcrum the lever upon the reaction member so that force exerted upon the actuator end portion of the lever to swing it towards its mold-open position is applied to raising said attachment means.

* * * * *